(12) United States Patent
Murata

(10) Patent No.: US 7,983,130 B2
(45) Date of Patent: Jul. 19, 2011

(54) OPTICAL DISK DEVICE AND OPTICAL DISK PROCESSING SYSTEM HAVING OPTICAL DISK DEVICE

(75) Inventor: Tatsuya Murata, Tokorozawa (JP)

(73) Assignee: TEAC Corporation, Tama-shi, Tokyo (JP)

( * ) Notice: Subject to any disclaimer, the term of this patent is extended or adjusted under 35 U.S.C. 154(b) by 222 days.

(21) Appl. No.: 12/479,693

(22) Filed: Jun. 5, 2009

(65) Prior Publication Data

US 2009/0323490 A1 Dec. 31, 2009

(30) Foreign Application Priority Data

Jun. 25, 2008 (JP) ................................. 2008-166047

(51) Int. Cl.
G11B 7/00 (2006.01)
(52) U.S. Cl. ...................................................... 369/53.22
(58) Field of Classification Search .................. 369/53.1, 369/53.22, 47.27, 275.3, 53.11, 53.3, 53.31
See application file for complete search history.

(56) References Cited

U.S. PATENT DOCUMENTS

| 4,687,542 A | 8/1987 | Davis et al. |
| 4,966,519 A | 10/1990 | Davis et al. |
| 5,044,871 A | 9/1991 | Davis et al. |
| 7,149,169 B2 * | 12/2006 | Juan et al. ................... 369/53.22 |
| 2001/0009534 A1 | 7/2001 | Sato |
| 2005/0073925 A1 | 4/2005 | Juan |
| 2009/0323484 A1 | 12/2009 | Murata |

FOREIGN PATENT DOCUMENTS

| JP | 6029369 A | 2/1994 |
| JP | 2001283498 A | 10/2001 |
| JP | 2004095064 A | 3/2004 |
| JP | 3797318 B2 | 7/2006 |

OTHER PUBLICATIONS

Machine translation of JP 3797318 B2 into English; Kitaoka et al., 10 pages.
English Language translation of German Office Action dated May 5, 2010, relating to German Patent Application No. 10 2009 026 030.7-55, 2 pages.
German Office Action dated May 5, 2010, relating to German Patent Application No. 10 2009 026 030.7-55, 3 pages.

* cited by examiner

*Primary Examiner* — Nabil Z Hindi
(74) *Attorney, Agent, or Firm* — Seed IP Law Group PLLC

(57) ABSTRACT

An optical disk processing system having a recording unit and a printing unit is provided. An optical disk processing system comprises a printing unit and a recording unit. An optical disk is driven with a low torque and then with a high torque. Based on reaching times until target rotational speeds are reached when the optical disk is driven with the low torque and the high torque, a type of the optical disk is judged. Loading of a plurality of optical disks is detected when the judgment results for low torque and for high torque do not match.

14 Claims, 4 Drawing Sheets

OPTICAL DISK DEVICE AND OPTICAL DISK PROCESSING SYSTEM HAVING OPTICAL DISK DEVICE

PRIORITY INFORMATION

This application claims priority to Japanese Patent Application No. 2008-166047, filed on Jun. 25, 2008, which is incorporated herein by reference in its entirety.

BACKGROUND

1. Technical Field

The present invention relates to an optical disk device and an optical disk processing system having the optical disk device, and in particular to loading of an optical disk in an optical disk device.

2. Description of the Related Art

When a CD or a DVD is mass-produced, the manufacturing cost is reduced by using a large-scale device having a disk changer. On the other hand, an optical disk processing system is proposed in which a recording unit which writes information on the optical disk, a printing unit which prints on a label surface of the optical disk, and a disk changer are integrated, in order to handle the cases of custom-made optical disks which do not require mass production such as, for example, school learning materials, commemorative items, presents, etc. In this optical disk processing system, a sequence of processes are automatically executed in which an optical disk which is not yet processed is transported from a stocker to a recording unit and loaded, data is recorded by the recording unit, the recorded optical disk is ejected, the recorded optical disk is transported to the printing unit and a print is applied on the label surface, and the printed optical disk is again transported back to the stacker.

Japanese Patent No. 3797318 discloses an optical disk processing system in which a recording unit, a printing unit, and a disk changer are integrated.

In the optical disk processing system, the optical disks must be taken out from the stocker one by one, transported to the recording unit, and loaded. However, depending on the surface state of the optical disk, the optical disks may stick to each other, and a plurality of optical disks may be transported to the recording unit together and loaded. The optical disk loaded on the tray of the recording unit is normally clamped by a magnetic damper and is rotationally driven by a spindle. However, when a plurality of optical disks are loaded in the stuck state, the clamping force of the magnetic damper is weakened by the thickness of the plurality of stacked optical disks and the optical disk cannot be firmly clamped, and as a result, the rotational control becomes unstable, or the control cannot be achieved when the number of rotations is increased and the optical disk vibrates. Therefore, when a plurality of optical disks are loaded, this phenomenon must be quickly detected.

SUMMARY

The present invention advantageously provides an optical disk device and an optical disk processing system having the optical disk device which can quickly and reliably detect that a plurality of optical disks are loaded.

According to one aspect of the present invention, there is provided an optical disk device comprising a unit which rotationally drives a loaded optical disk with a relatively low torque and then rotationally drives the loaded optical disk with a relatively high torque, a unit which measures a first reaching time until a first target number of rotations is reached when the optical disk is rotationally driven with the low torque, a first judging unit which judges a type of the optical disk by comparing the first reaching time with a threshold time for low torque, a unit which measures a second reaching time until a second target number of rotations is reached when the optical disk is rotationally driven with the high torque, a second judging unit which judges a type of the optical disk by comparing the second reaching time with a threshold time for high torque, and a detecting unit which detects that a number of loaded optical disks is a plurality based on a judgment result by the first judging unit and a judgment result by the second judging unit.

According to another aspect of the present invention, it is preferable that, in the optical disk device, the detecting unit detects that the number of loaded optical disks is a plurality when the judgment result by the first judging unit and the judgment result by the second judging unit differ from each other.

According to another aspect of the present invention, there is provided an optical disk comprising a unit which rotationally drives a loaded optical disk with a relatively low torque for a first time period and then rotationally drives the optical disk with a relatively high torque for a second time period, a unit which measures a first number of rotations after the first time period has elapsed when the optical disk is rotationally driven with the low torque, a first judging unit which judges a type of the optical disk by comparing the first number of rotations with a threshold number of rotations for low torque, a unit which measures a second number of rotations after the second time period has elapsed when the optical disk is rotationally driven with the high torque, a second judging unit which judges a type of the optical disk by comparing the second number of rotations with a threshold number of rotations for high torque, and a detecting unit which detects that a number of loaded optical disks is a plurality based on a judgment result by the first judging unit and a judgment result by the second judging unit.

According to another aspect of the present invention, it is preferable that, in the optical disk device, the detecting unit detects that the number of loaded optical disks is a plurality when the judgment result by the first judging unit and the judgment result by the second judging unit differ from each other.

According to another aspect of the present invention, there is provided an optical disk processing system comprising the optical disk device, and a printing unit which prints on a label surface of the optical disk, wherein the system consecutively processes data recording at the optical disk device and the label surface printing at the printing unit.

According to another aspect of the present invention, there is provided an optical disk processing system that comprises a plurality of the optical disk devices, and a transporting mechanism which transports an optical disk to each of the plurality of the optical disk devices in a predetermined order.

DETAILED DESCRIPTION

A preferred embodiment of the present invention will now be described with reference to the drawings.

Figure 1:
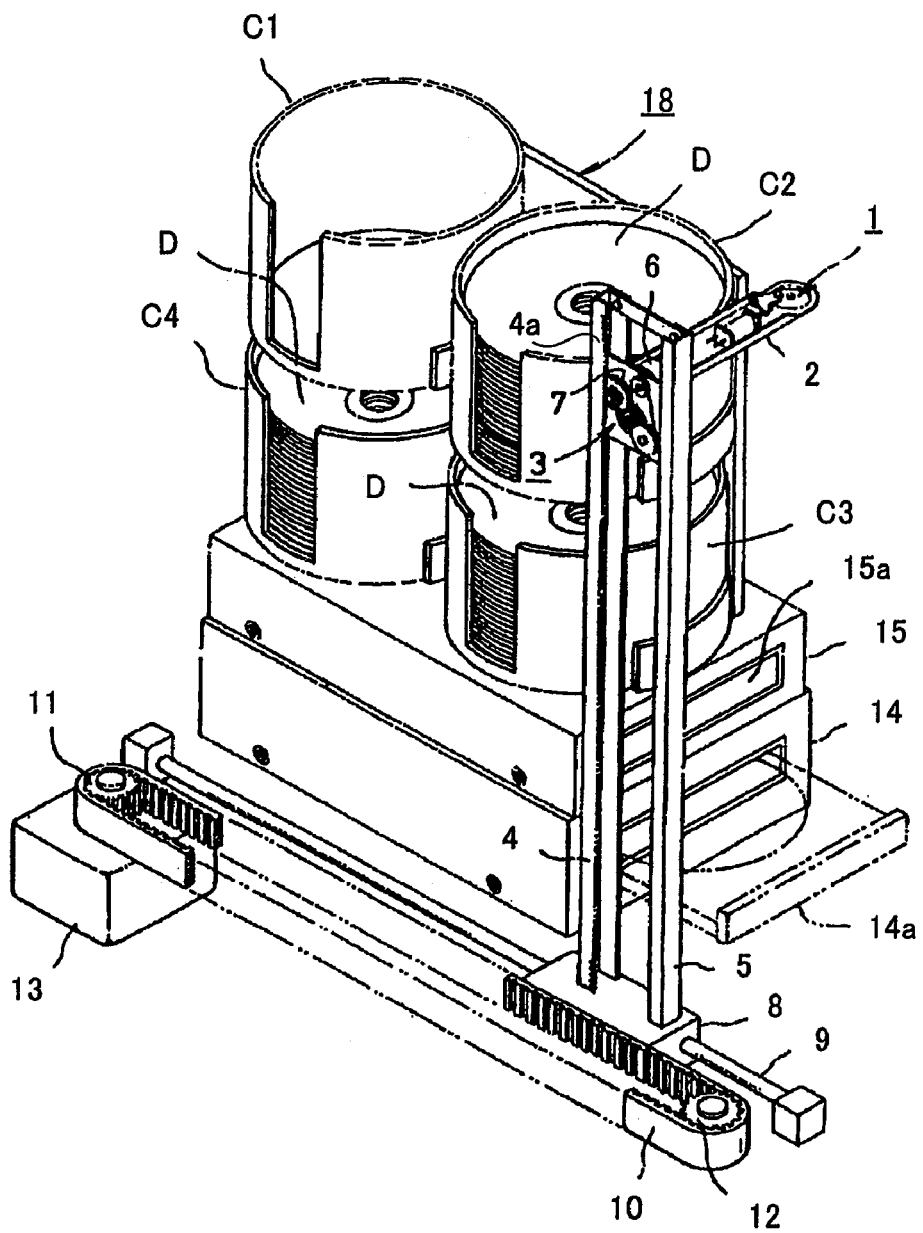
FIG. 1 is an overview of an optical disk processing system according to a preferred embodiment of the present invention.

FIG. 1 shows an overview of an optical disk processing system having an optical disk device according to a preferred embodiment of the present invention. On an upper surface of a ceiling plate of a recording unit 15 which is an optical disk device, a plurality of cases C1, C2, C3, and C4 for storing an optical disk D and having a same volume are placed. These cases C1, C2, C3, and C4 are supported by a support structure 18 placed at the back of the cases, and are configured to be detachable from the support structure 18. In the placement state of the cases C1, C2, C3, and C4 shown in FIG. 1, the case C1 is set as a collection case and cases C2, C3, and C4 are set as stock cases, and a predetermined number of optical disks which are not yet processed are stored in the cases.

A clamp unit 1 is for clamping a center hole of the optical disk D, and is provided on a transport arm 2. One end of the transport arm 2 is fixed on an elevation mechanism 3. The elevation mechanism 3 is supported by support columns 4 and 5, a driving force of an output shaft of a motor 6 is transmitted to a gear 7 through a pulley, the elevation mechanism 3 is moved up and down along a vertical direction by engagement of the gear 7 with a rack gear 4a of the support column 4, and the transport arm 2 is moved up and down.

An end of the supports 4 and 5 is fixed on a slider block 8 which is supported in a slidable manner on a guide shaft 9. The slider block 8 is also connected and fixed on a belt 10 which is provided in a stretched manner between wheels 11 and 12. With the belt 10 driven by a motor 13, the slider block 8, the support columns 4 and 5, and the transport arm 2 move back and forth in a horizontal direction.

A printing unit 14 prints on a label surface of the optical disk D loaded by a disk tray 14a. The recording unit 15 records information on an optical disk D which is loaded by a disk tray 15a.

In the transporting of the optical disk D among the cases, printing unit 14, and recording unit 15, the transporting of the optical disk D in the upward and downward directions is achieved by the elevation mechanism 3 and the transporting in the horizontal direction is achieved by driving the belt 10.

In the process of the optical disk D, a control program is configured so that the optical disks are processed for each of the cases C2, C3, and C4 which are stock cases, and a system processor which controls an operation of the overall system executes the control program. First, an optical disk D at an uppermost layer of the case C2 is clamped by the dick clap unit 1, and is sequentially transported to the printing unit 14 and the recording unit 15 and subjected to predetermined processes. After the predetermined processes are completed, the processed optical disk D is stored in the case C1 which is the collection case. After the optical disks D of the case C2 are sequentially processed and the case C2 is emptied of the optical disks D, the control program at this point judges to set the case C2 as the collection case. As the process is continued, after the predetermined processes are applied to the optical disks D which are stored in the case C3 and which are not yet processed, the optical disks D are stored in the case C2 which is now set as a collection case. Then, similar processes are repeated.

In the above description, for an optical disk D, first the printing unit prints on the label surface, and then the recording unit 15 records the data. However, the present invention is not limited to such a configuration, and it is also possible to employ a configuration, for example, in which the optical disk D taken out from the case is first transported to the recording unit 15, data is recorded by the recording unit 15, and then the printing unit 14 prints on the label surface. In the present embodiment, a configuration is described in which the optical disk is first transported to the recording unit 15 after the optical disk is taken out from the case and loaded into the recording unit 15.

Figure 2:
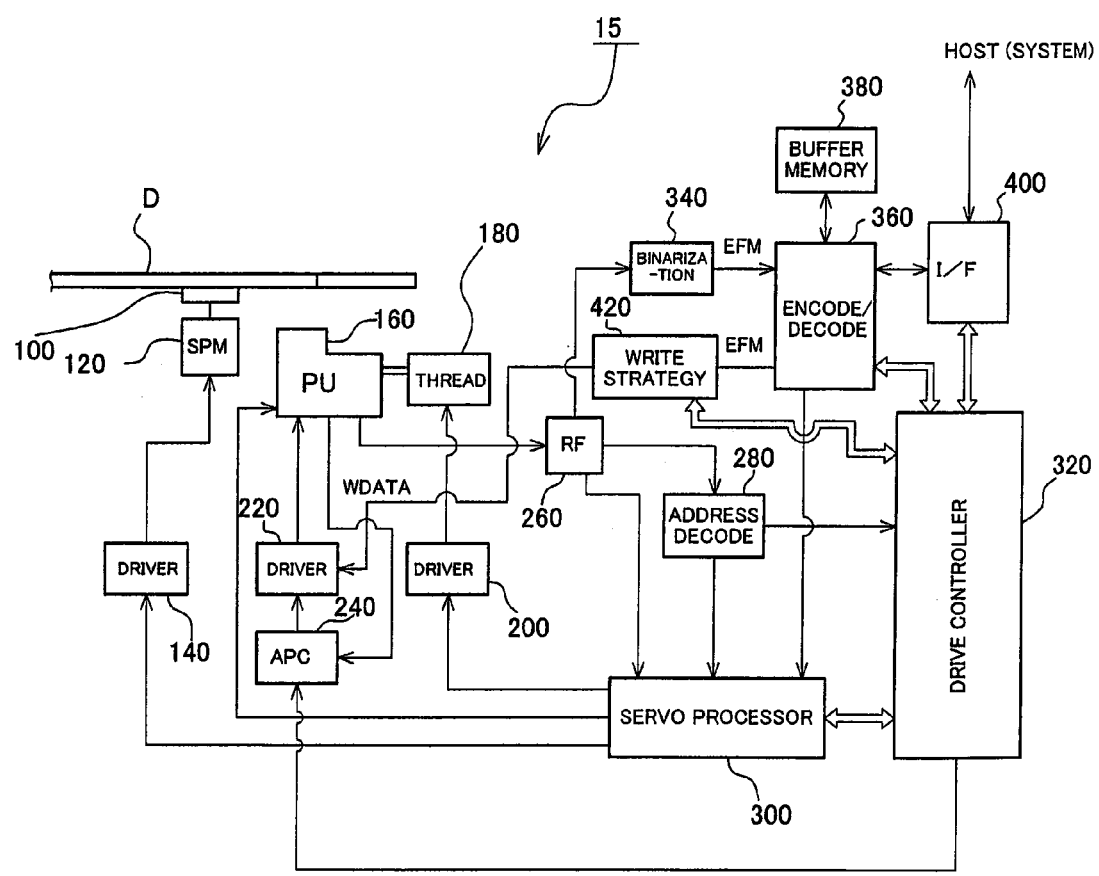
FIG. 2 is a structural diagram of an optical disk device (recording unit).

FIG. 2 shows a structure of the recording unit 15 as an optical disk device. The optical disk D which is transported by the transport arm 2 and which is loaded by the tray 15a is clamped by a magnetic clamper (not shown), is placed on a turntable 100, and is rotationally driven by a spindle motor (SPM) 120 along with the turntable 100. The spindle motor SPM 120 is driven by a driver 140, which is servo-controlled by a servo processor 300 so that the spindle motor SPM 120 has a desired rotational speed.

An optical pickup 160 comprises a laser diode (LD) for irradiating laser light on the optical disk D and a photodetector (PD) which receives reflected light from the optical disk D and converts into an electric signal, and is placed opposing the optical disk D. The optical pickup 160 is driven in a radial direction of the optical disk D by a thread motor 180 which is driven by a driver 200. The driver 200 is servo-controlled by the servo processor 300 similar to the driver 140. In addition, the LD of the optical pickup 160 is driven by a driver 220, and in the driver 220, a drive current is controlled by an automatic power control circuit (APC) 240 so that the laser power is at a desired value. The APC 240 and the driver 220 control the amount of light emission of the LD using an instruction from a system controller 320. In FIG. 2, the driver 220 is provided separately from the optical pickup 160, but the driver 220 may alternatively be equipped in the optical pickup 160.

When data is recorded on the optical disk D, data to be recorded which is supplied from the system is supplied through an interface I/F 400 to an encode/decode circuit 360. The encode/decode circuit 360 stores the data to be recorded in a buffer memory 380, encodes the data to be recorded into modulated data, and supplies the modulated data to a write strategy circuit 420. The write strategy circuit 420 converts the modulated data into multi-pulses (a pulse train) according to a predetermined recording strategy, and supplies as recording data to the driver 220. Because the recording strategy affects the recording quality, the recording strategy is normally fixed to a certain optimum strategy. Laser light having power modulated by the recording data is irradiated from the LD of the optical pickup 160 and data is recorded on the optical disk D. After the data is recorded, the optical pickup 160 irradiates laser light of replay power to replay the recording data and supplies to an RF circuit 260. The RF circuit 260 supplies the replay signal to a binarization circuit 340, and binarized data is supplied to the encode/decode circuit 360. The encode/decode circuit 360 decodes the modulated data, and matches with the recording data stored in the buffer memory 380. The result of the matching is supplied to the drive controller 320. The drive controller 320 determines whether the data continues to be recorded or if an exchange process is to be executed based on the result of the matching.

Figure 3:
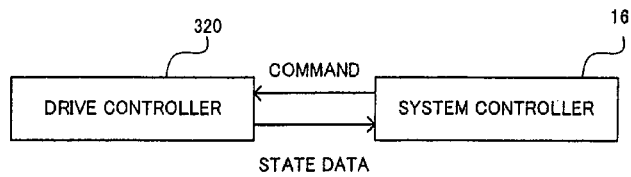
FIG. 3 is a diagram for explaining data exchange between a system controller and a drive controller.

In such a structure, commands and data are exchanged between a system controller 16 which controls the overall system shown in FIG. 1 and the drive controller 320 which controls the recording unit 15 shown in FIG. 2. As shown in FIG. 3, the system controller 16 transmits a start command and an end command for data recording to the drive controller 320, and the drive controller 320 transmits data related to completion of data recording and the state of the recording unit 15.

The optical disks D are transported by the transport arm 2 one by one. However, depending on the state of the surface of the optical disk D, a plurality of optical disks D, for example, two optical disks D, may be transported together in a state of being stuck close together. In this case, the plurality of optical disks D are loaded to the recording unit 15, but because the clamping force of the magnetic damper is weakened, the plurality of optical disks D cannot be firmly clamped. As a result, when the optical disk D is rotationally driven at a high speed by the spindle motor 120, because the optical disks are not sufficiently clamped, the plurality of optical disks D would slip. In this state, the data cannot be normally recorded, and because the optical disk D slips, the spindle motor 120 reaches a predetermined rotational speed in a shorter period of time than in the normal case, resulting in an erroneous judgment that the optical disk D is not yet loaded and transmission of this determination to the system controller 16, and consequently, the system controller 16 taking out a new optical disk D from the case and transporting it to the recording unit 15.

In consideration of this, the drive controller 320 of the present embodiment quickly and reliably detects that a plurality of optical disks D are loaded through the following process.

Figure 4:
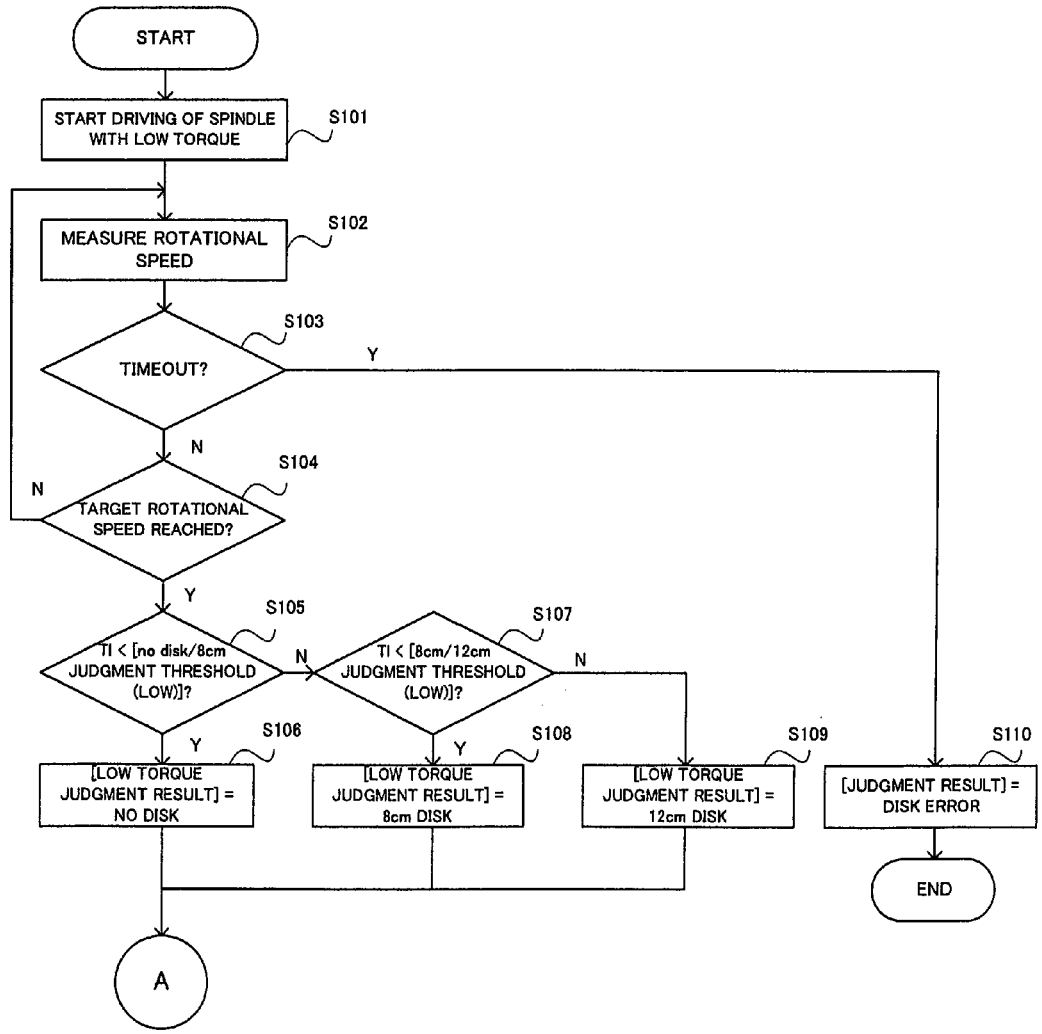
FIG. 4 is a process flowchart (part 1) of a preferred embodiment of the present invention.
Figure 5:
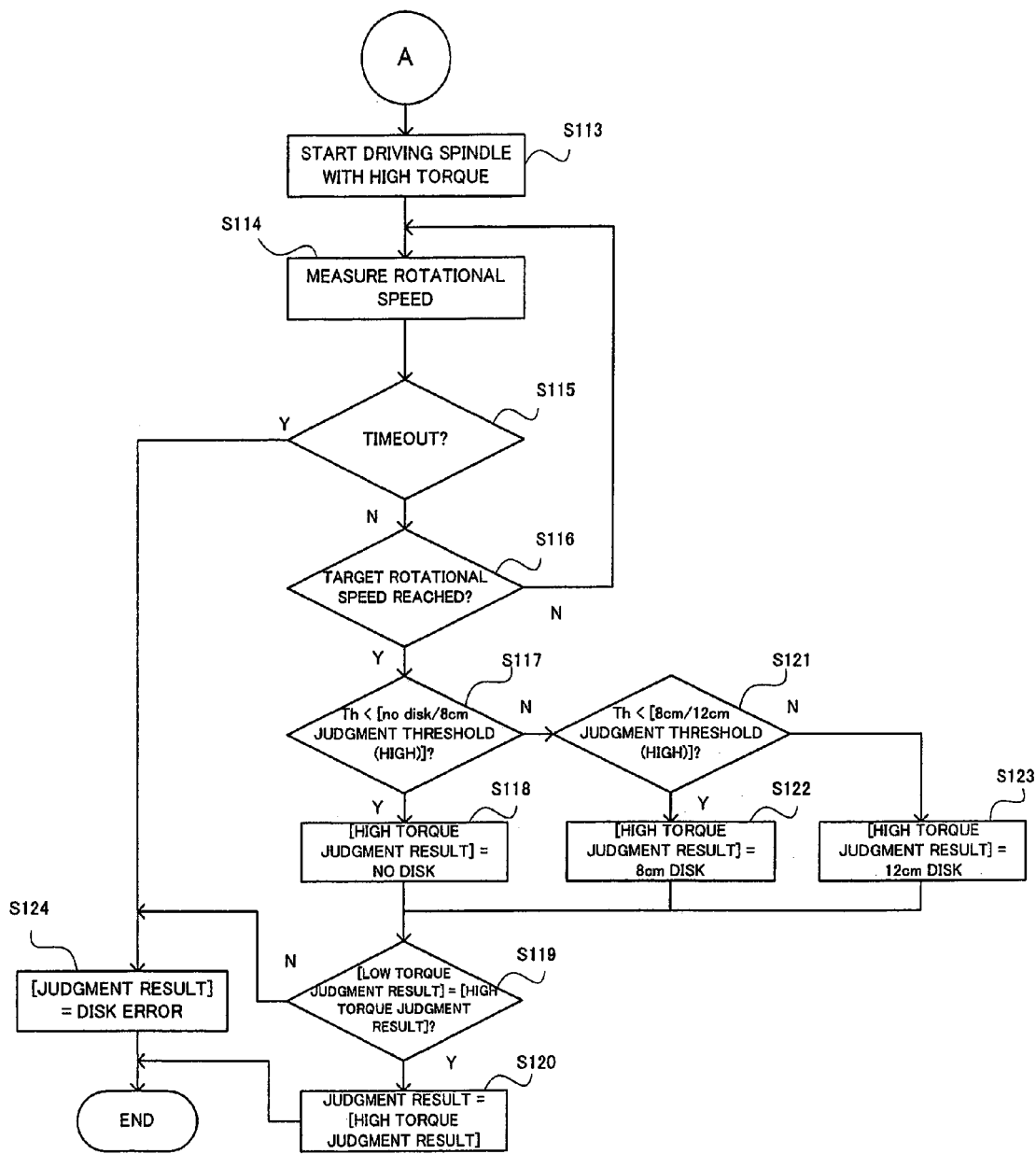
FIG. 5 is a process flowchart (part 2) of a preferred embodiment of the present invention.

FIGS. 4 and 5 show a detection process flowchart in the drive controller 320. First, in FIG. 4, when the optical disk D is loaded, the drive controller 320 drives the spindle motor 120 with a low torque (S101). The low torque means a torque which is sufficiently low to drive the optical disk without slipping even in the case where a plurality of optical disks D (for example, two optical disks D) are loaded in a stuck state. Then, a rotational speed is measured (S102), and a time period until a target rotational speed is reached is measured. For example, the target rotational speed is set to 300 rpm and the time required in the period of rotational speed of 0 rpm-300 rpm is measured. The rotational speed is measured, for example, based on an FG pulse of the spindle motor 120. It is then judged whether or not a timeout has been reached without reaching the target rotational speed (S103). As a threshold time for judging whether or not timeout has been reached, a time period is set which is slightly shorter than a time which is required for driving two optical disks D. When two optical disks D are driven, the driving time is slowed because of the increased inertia by a factor of two compared to the case where one optical disk D is driven. Thus, when the time until reaching the target rotational speed exceeds the threshold time, it is judged that two optical disks are loaded, and that there is a disk error (S110). When, on the other hand, the target rotational speed is reached without the timeout (S104), the reaching time T1 is compared with a plurality of threshold times.

The threshold times are a first threshold time Tth1 (low) for distinguishing a no-disk state and an 8-cm optical disk and a second threshold time Tth2 (low) for distinguishing the 8-cm optical disk and a 12-cm optical disk. The index of (low) indicates that the threshold times are for low torque driving. Here, Tth1 (low)<Tth2 (low). The threshold time is stored in a memory of the drive controller 320 in advance. The drive controller 320 compares the time T1 until reaching the target rotational speed and Tth1 (low) (S105). If T1<Tth1 (low), it is provisionally judged as the state of no-disk (S106). If, on the other hand, T1≧Tth1 (low), T1 and Tth2 (low) are compared (S107). If T1<Tth2 (low), it is provisionally judged that the optical disk is the 8-cm optical disk (S108). If, on the other hand, T1≧Tth2 (low), it is provisionally judged that the optical disk is the 12-cm optical disk (S109).

In the processes of S106, S108, and S109, the judgment is provisional because in a later process, as will be described below, the judgment result is compared to a judgment result when the optical disk D is driven with a high torque, to judge whether or not two optical disks D are loaded. The provisional judgment result in S106, S108, and S109 will collectively be referred to as "low torque judgment result". The low torque judgment result is stored in the memory of the drive controller 320. After the low torque judgment result is obtained through the provisional judgment of the type of the optical disk D as described above, the process proceeds to the process of FIG. 5.

In FIG. 5, the drive controller 320 drives the spindle motor 120 with a high torque (S113). That is, the drive controller 320 drives the spindle motor 120 with a higher drive voltage than when the spindle motor 120 is driven with the low torque. The high torque refers to a torque which is sufficiently high, when two optical disks D are loaded, to cause slip between the optical disks D or slip between the turntable 100 and the optical disk D. A rotational speed is measured, a time until reaching a target rotational speed is measured, and it is judged whether or not timeout has been reached (S114, S115). For example, the target rotational speed is set at 1000 rpm and a time required in the range of the rotational speed of 500 rpm~1000 rpm is measured. The threshold time for judging whether or not the timeout has been reached is set at a time period which is slightly shorter than the time required when two optical disks D are driven. When two optical disks D are driven, the drive time is slowed due to the increase in the inertia by a factor of 2 compared to the case where one optical disk D is driven. Thus, when the time until reaching the target rotational speed exceeds the threshold time, it is judged that two optical disks are loaded, and that there is a disk error (S124). When two optical disks D are rotationally driven without slipping, it would be judged with this process that there are two optical disks D. When, on the other hand, the target rotational speed is reached without timeout (when optical disk D slips), the time Th until reaching the target rotational speed is then compared with a threshold time.

The threshold times are a first threshold time Tth1 (high) for distinguishing between a no-disk state and the 8-cm optical disk and a second threshold time Tth2 (high) for distinguishing between the 8-cm optical disk and the 12-cm optical disk. The index of (high) indicates that the threshold times are for high torque driving. Here, Tth1 (high)<Tth2 (high). Similar to the threshold times Tth1 (low) and Tth2 (low), these threshold times are stored in the memory of the drive controller 320 in advance. The drive controller 320 compares the time Th until reaching the target rotational speed and Tth1 (high) (S117). If Th<Tth1 (high), it is provisionally judged that there is no disk (S118). If, on the other hand, Th≧Tth1 (high), Th and Tth2 (high) are compared in size (S121). If Th<Tth2 (high), it is provisionally judged that the optical disk is the 8-cm optical disk (S122). If, on the other hand, Th≧Tth2 (high), it is provisionally judged that the optical disk is the 12-cm optical disk (S123). The results of the provisional judgments in S118, S122, and S123 will collectively be called a "high torque judgment result".

After the high torque judgment result is obtained, the drive controller 320 compares the high torque judgment result with the low torque judgment result stored in the memory (S119). If the judgment results match, the high torque judgment result is set as the final judgment result (S120). If, on the other hand, the judgment results do not match, it is judged that two optical disks D are loaded, and that there is a disk error (S124).

A case is considered in which two 8-cm optical disks D are loaded in a stuck state, the disks are driven with a low torque, the target rotational speed is reached without the timeout, the reaching time is compared with the threshold time, and it is provisionally judged that the disk is a 12-cm optical disk. Then, the state transitions from the state of the low torque rotation to the state of high torque rotation, the target rotational speed is reached without the timeout, the reaching time is compared with the threshold time, and it is provisionally judged that the disk is the 8-cm optical disk. This is because at the high torque, the two optical disks D slip with respect to each other or between the turntable 100 and the optical disk D, and consequently, the reaching time is shortened. In this case, the low torque judgment result is 12-cm optical disk and the high torque judgment result is 8-cm optical disk, and thus, the judgment results differ from each other, and it is judged that two optical disks D are loaded.

Another case is considered in which two 8-cm optical disks are loaded in a stuck state, the disks are driven at the low torque, the target rotational speed is reached without timeout, the reaching time is compared with the threshold time, and it is provisionally judged that the disk is the 12-cm optical disk. The state is transitioned from the state of low torque rotation to the state of high torque rotation, the target rotational speed is reached without timeout, the reaching time is compared with the threshold time, and it is provisionally judged that there is no disk. In this case also, the low torque judgment result is 12-cm optical disk and the high torque judgment result is no disk, and thus, the judgment results differ from each other. Therefore, it is judged that two optical disks D are loaded.

Another case is considered in which two 12-cm optical disks D are loaded in a stuck state, the disks are driven at the low torque, the target rotational speed is reached without timeout, the reaching time is compared with the threshold time, and it is provisionally judged that the disk is the 12-cm optical disk. Then, the state transitions from the state of low torque rotations to the state of high torque rotations, the target rotational speed is reached without timeout, the reaching time is compared with the threshold time, and it is provisionally judged that there is no disk or that the disk is 8-cm optical disk. In this case also, the low torque judgment result is 12-cm optical disk and the high torque judgment result is no disk or 8-cm optical disk, and thus the judgment results differ from each other. Therefore, it is judged that two optical disks D are loaded.

When only one 12-cm optical disk D is loaded, it is judged both at the driving with the low torque and at the driving with the high torque that the disk is the 12-cm optical disk, and the judgment results match. This is similar for the case of one 8-cm optical disk D. The drive controller 320 transmits the judgment result to the system controller 16. When the system controller 16 receives a disk error, that is, a signal indicating that two optical disks D are loaded, from the drive controller 320, the system controller 16 executes a predetermined error process. The predetermined error process can be arbitrarily set for each system. For example, the two optical disks D may be taken out from the recording unit and a new optical disk D may again be transported, or when a plurality of recording units 15 exist, the operation of the recording unit 15 to which two optical disks D are loaded may be stopped and only the other recording units 15 may be operated.

In this manner, in the present embodiment, when the optical disk is loaded, first, the optical disk D is rotationally driven with a relatively low torque and the type of the disk is judged, the optical disk D is then rotationally driven with a relatively high torque and the type of the disk is judged, and the low torque judgment result and the high torque judgment result are compared, so that it is possible to reliably detect whether or not a plurality of optical disks D are loaded. In the present embodiment, because the detection process can be executed while transitioning from the low torque state to the high torque state in the process of reaching the rotational speed necessary for recording data on the optical disk D (for example, 8000 rpm), the detection process can be executed efficiently and quickly. The low torque in the present embodiment is a torque which is less than or equal to a predetermined value and in which, when two optical disks D are loaded, the two optical disks D in the stuck state rotate without slipping with respect to each other or between the turntable 100 and the optical disk D. The high torque in the present embodiment is a torque which is larger than a predetermined value and in which, when two optical disks D are loaded, the two optical disks D in the stuck state rotate while slipping with respect to each other or between the turntable 100 and the optical disk D. The specific numerical values of the low torque and the high torque can be determined by actually driving two optical disks D in advance.

In the present embodiment, it is judged in the process of S103 of FIG. 4 whether or not the reaching time of the target rotational speed has timed out. Alternatively, it is also possible to not execute this judgment. In this case, a third threshold time Tth3 (low) for distinguishing between 12-cm optical disk and two optical disks is set, the reaching time T1 is compared in size with Tth3 (low) after it is judged in S107 as "NO", the optical disk is provisionally judged as 12-cm optical disk when T1<Tth3 (low), and a disk error is judged when T1≧Tth3. This similarly applies to S115 of FIG. 5.

In addition, in the present embodiment, when the judgment results match in S120 of FIG. 5, the high torque judgment result is set as the final judgment result. Alternatively, it is also possible to set the low torque judgment result as the final judgment result.

Moreover, in the present embodiment, the reaching time to the target rotational speed is measured, the reaching time is compared in size with the threshold time, and the type of the optical disk is determined. Alternatively, a configuration may be employed in which a rotational speed when the disk is rotationally driven for a predetermined time period is measured, the rotational speed is compared in size with a threshold rotational speed, and the type of the optical disk is judged. In this case also, it is possible to detect that a plurality of optical disks D are loaded when the result of judgment based on the rotational speed when the disk is driven for a predetermined time period with low torque and the result of judgment based on the rotational speed when the disk is driven for a predetermined time period with high torque differ from each other.

Furthermore, in the present embodiment, the no-disk state and the 8-cm optical disk are distinguished using the first threshold value Tth1 (low) at S105 of FIG. 4. Alternatively, when it is separately detected at the system side that the optical disk D is transported using the transport arm 2 and is loaded into the recording unit 15, the detection of no-disk state is not necessary, and the process of S105 may be omitted. This similarly applies to S117 of FIG. 5.

In the present embodiment, an optical disk processing system having a recording unit as an optical disk device and a printing unit is exemplified. The present embodiment, however, is not limited to such a configuration, and may be applied to a system in which a plurality of optical disk devices, for example, two optical disk devices, are provided as recording units, the optical disks D are sequentially transported by a transporting function to the recording units, and data is recorded. Such a processing system is a system which can record the same data on a plurality of optical disks D and is sometimes called a duplicator. Two recording units are set as a first recording unit and a second recording unit, an optical disk which is not yet recorded is taken out from a stocker and transported to the first recording unit, and data is recorded. During the data recording, the transporting mechanism takes out the next non-recorded optical disk D from the stocker and transports to the second recording unit. When the data recording in the first recording unit is completed, the transporting unit takes out the recorded optical disk D from the first recording unit and stores in the stocker. The transporting mechanism takes out a non-recorded disk D from the stocker and transports to the first recording unit. When loading of two optical disks D at the first recording unit is detected, the system controller of the duplicator disables the first recording unit and executes the data recording of the optical disk D with only the second recording unit.

What is claimed is:

1. An optical disk device comprising:
    a unit which rotationally drives a loaded optical disk with a relatively low torque and then rotationally drives the loaded optical disk with a relatively high torque;
    a unit which measures a first reaching time until a first target rotational speed is reached when the optical disk is rotationally driven with the low torque;
    a first judging unit which judges a type of the optical disk by comparing the first reaching time with a threshold time for low torque;
    a unit which measures a second reaching time until a second target rotational speed is reached when the optical disk is rotationally driven with the high torque;
    a second judging unit which judges a type of the optical disk by comparing the second reaching time with a threshold time for high torque; and
    a detecting unit which detects that a number of loaded optical disks is a plurality based on a judgment result by the first judging unit and a judgment result by the second judging unit.

2. The optical disk device according to claim 1, wherein the detecting unit detects that the number of loaded optical disks is a plurality when the judgment result by the first judging unit and the judgment result by the second judging unit differ from each other.

3. The optical disk device according to claim 1, wherein the low torque is a torque which is less than or equal to a predetermined value and in which two optical disks in a stuck state rotate without slipping, and the high torque is a torque which is greater than a predetermined value and in which two optical disks in a stuck state slip and rotate.

4. The optical disk device according to claim 2, wherein the detecting unit detects that the number of loaded optical disks is a plurality when the first judging unit judges the type of the optical disk as a 12-cm optical disk and the second judging unit judges the type of the optical disk as an 8-cm optical disk.

5. The optical disk device according to claim 2, wherein the detecting unit detects that the number of loaded optical disks is a plurality when the first judging unit judges the type of the optical disk as a 12-cm optical disk and the second judging unit judges that there is no disk.

6. An optical disk processing system comprising:
    the optical disk device according to claim 1, and
    a printing unit which prints on a label surface of the optical disk, wherein
    the system consecutively processes data recording at the optical disk device and label surface printing at the printing unit.

7. An optical disk processing system comprising:
    a plurality of the optical disk devices according to claim 1, and
    a transporting mechanism which transports an optical disk to each of the plurality of the optical disk devices in a predetermined order.

8. An optical disk device comprising:
    a unit which rotationally drives a loaded optical disk with a relatively low torque for a first time period and then rotationally drives the optical disk with a relatively high torque for a second time period;
    a unit which measures a first rotational speed after the first time period has elapsed when the optical disk is rotationally driven with the low torque;
    a first judging unit which judges a type of the optical disk by comparing the first rotational speed with a threshold rotational speed for low torque;
    a unit which measures a second rotational speed after the second time period has elapsed when the optical disk is rotationally driven with the high torque;
    a second judging unit which judges a type of the optical disk by comparing the second rotational speed with a threshold rotational speed for high torque; and
    a detecting unit which detects that a number of loaded optical disks is a plurality based on a judgment result by the first judging unit and a judging result by the second judging unit.

9. The optical disk device according to claim 8, wherein the detecting unit detects that the number of loaded optical disks is a plurality when the judgment result by the first judging unit and the judgment result by the second judging unit differ from each other.

10. The optical disk device according to claim 8, wherein the low torque is a torque which is less than or equal to a predetermined value and in which two optical disks in a stuck state rotate without slipping, and the high torque is a torque which is greater than a predetermined value and in which two optical disks in a stuck state slip and rotate.

11. The optical disk device according to claim 9, wherein the detecting unit detects that the number of loaded optical disks is a plurality when the first judging unit judges the type of the optical disk as a 12-cm optical disk and the second judging unit judges the type of the optical disk as an 8-cm optical disk.

12. The optical disk device according to claim 9, wherein the detecting unit detects that the number of loaded optical disks is a plurality when the first judging unit judges the type of the optical disk as a 12-cm optical disk and the second judging unit judges that there is no disk.

13. An optical disk processing system comprising:
    the optical disk device according to claim 8; and
    a printing unit which prints on a label surface of the optical disk, wherein
    the system consecutively processes data recording at the optical disk device and label surface printing at the printing unit.

14. An optical disk processing system comprising:
    a plurality of the optical disk devices according to claim 8; and
    a transporting mechanism which transports an optical disk to each of the plurality of the optical disk devices in a predetermined order.

* * * * *